United States Patent
Bian et al.

(10) Patent No.: US 10,649,245 B1
(45) Date of Patent: May 12, 2020

(54) ELECTRO-OPTIC MODULATORS WITH STACKED METAL, DIELECTRIC, AND ACTIVE LAYERS

(71) Applicant: GLOBALFOUNDRIES Inc., Grand Cayman (KY)

(72) Inventors: Yusheng Bian, Ballston Lake, NY (US); Ajey Poovannummoottil Jacob, Watervliet, NY (US); Abu Thomas, Brookline, MA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 16/298,446

(22) Filed: Mar. 11, 2019

(51) Int. Cl.
  *G02F 1/035* (2006.01)
  *G02F 1/025* (2006.01)
  *G02F 1/015* (2006.01)

(52) U.S. Cl.
  CPC ...... *G02F 1/025* (2013.01); *G02F 2001/0151* (2013.01); *G02F 2202/105* (2013.01)

(58) Field of Classification Search
  CPC .............. G02F 1/025; G02F 2202/105; G02F 2001/0151
  See application file for complete search history.

(56) References Cited

U.S. PATENT DOCUMENTS

| | | | | |
|---|---|---|---|---|
| 7,583,869 B2 * | 9/2009 | Kang | ............... | H01S 5/026 385/129 |
| 8,184,929 B2 * | 5/2012 | Kish, Jr. | ............... | B82Y 20/00 385/1 |
| 8,644,086 B2 * | 2/2014 | Ide | ............... | G11C 29/787 365/189.05 |
| 2004/0247233 A1 * | 12/2004 | Grubb | ............... | G02B 6/12004 385/14 |
| 2008/0212914 A1 * | 9/2008 | Marks | ............... | B82Y 20/00 385/2 |
| 2010/0247021 A1 * | 9/2010 | Cunningham | ............... | G02F 1/025 385/1 |
| 2016/0349594 A1 | 12/2016 | Wurtz et al. | | |

OTHER PUBLICATIONS

Sorger et al., "Ultra-compact silicon nanophotonic modulator with broadband response" Nanophotonics 1 (2012): 17-22 © 2012.
Lee et al., "Nanoscale Conducting Oxide PlasMOStor", Nano Let 2014, 14, 11, 6463-6468.
Krasavin, et al., "Photonic Signal Processing on Electronic Scales: Electro-Optical Field-Effect Nanoplasmonic Modulator", Phys. Rev. Lett. 109, 053901—Published Jul. 31, 2012.

(Continued)

*Primary Examiner* — Ellen E Kim
(74) *Attorney, Agent, or Firm* — Thompson Hine LLP; Anthony Canale

(57) ABSTRACT

Structures for an electro-optic modulator and methods of fabricating a structure for an electro-optic modulator. The electro-optic modulator is arranged over a portion of a first waveguide core. The electro-optic modulator may include an electrode, an active layer, a second waveguide core, and a dielectric layer that is arranged between the active layer and the second waveguide core. The active layer is composed of a material having a refractive index that is a function of a bias voltage applied between the electrode and the first waveguide core.

20 Claims, 4 Drawing Sheets

(56) References Cited

OTHER PUBLICATIONS

Melikyan et al., "High-speed plasmonic phase modulators", Nature Photonics vol. 8, pp. 229-233 (2014).
Vasudev et al., "Electro-optical modulation of a silicon waveguide with an "epsilon-near-zero" material", Opt. Express 21, 26387-26397 (2013).
Dionne, et al., "PlasMOStor: A Metal-Oxide-Si Field Effect Plasmonic Modulator", Nano Letters 2009 9 (2), 897-902.

* cited by examiner

ELECTRO-OPTIC MODULATORS WITH STACKED METAL, DIELECTRIC, AND ACTIVE LAYERS

BACKGROUND

The present invention relates to photonics chips and, more specifically, to structures for an electro-optic modulator and methods of fabricating a structure for an electro-optic modulator.

Photonics chips are used in many applications and systems including, but not limited to, data communication systems and data computation systems. A photonics chip integrates optical components, such as waveguides, optical switches, and bends, and electronic components, such as field-effect transistors, into a unified platform. Among other factors, layout area, cost, and operational overhead may be reduced by the integration of both types of components.

A photonics chip may include an electro-optic modulator used as an optical switch to selectively route an incoming optical signal from an input to a destination output without converting the optical signal to an electrical signal. For example, through the modulation, the selective routing can be utilized to convert an arriving continuous optical signal into a departing encoded data stream. Optical switches may be formed, for example, using Mach-Zehnder interferometer (MZI) modulators. A disadvantage of this type of switching is that MZI modulators exhibit a weak electro-optic effect and, for that reason, MZI modulators must have a large form factor that results in a large footprint on the photonics chip. During operation, MZI modulators also tend to consume large amounts of power.

Improved structures for an electro-optic modulator and methods of fabricating a structure for an electro-optic modulator are needed.

SUMMARY

In an embodiment of the invention, a structure includes an electro-optic modulator arranged over a portion of a first waveguide core. The electro-optic modulator includes an electrode, an active layer, a second waveguide core, and a dielectric layer arranged between the active layer and the second waveguide core. The active layer is composed of a material having a refractive index that is a function of a bias voltage applied between the electrode and the first waveguide core.

In an embodiment of the invention, a structure includes an electro-optic modulator arranged over a portion of a waveguide core. The electro-optic modulator includes an electrode, an active layer, and a first dielectric layer arranged between the active layer and the waveguide core. The active layer is composed of a material having a refractive index that is a function of a bias voltage applied between the electrode and the waveguide core. The structure further includes one or more second dielectric layers that are arranged between the active layer and the waveguide core. The electrode may be composed of copper.

In an embodiment of the invention, a method includes patterning a single-crystal semiconductor layer to form a first waveguide core, and forming an electro-optic modulator including an electrode, a second waveguide core, a dielectric layer, and an active layer that have a stacked arrangement over a portion of the first waveguide core. The dielectric layer is positioned in the stacked arrangement between the active layer and the second waveguide core, and the active layer is comprised of a material having a refractive index that is a function of a bias voltage applied to the electrode and the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
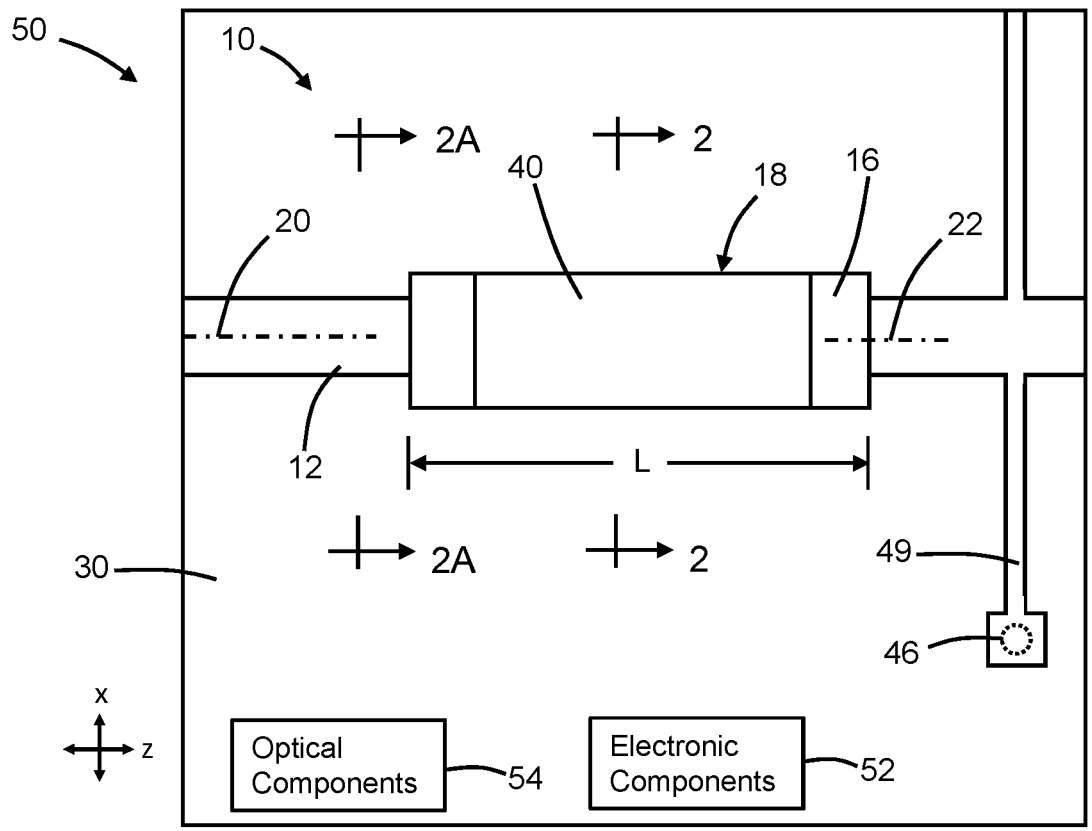
FIG. 1 is a diagrammatic top view of a photonics chip including a structure at an initial fabrication stage of a processing method in accordance with embodiments of the invention and in which some dielectric layers are omitted for clarity of description.
Figure 2:
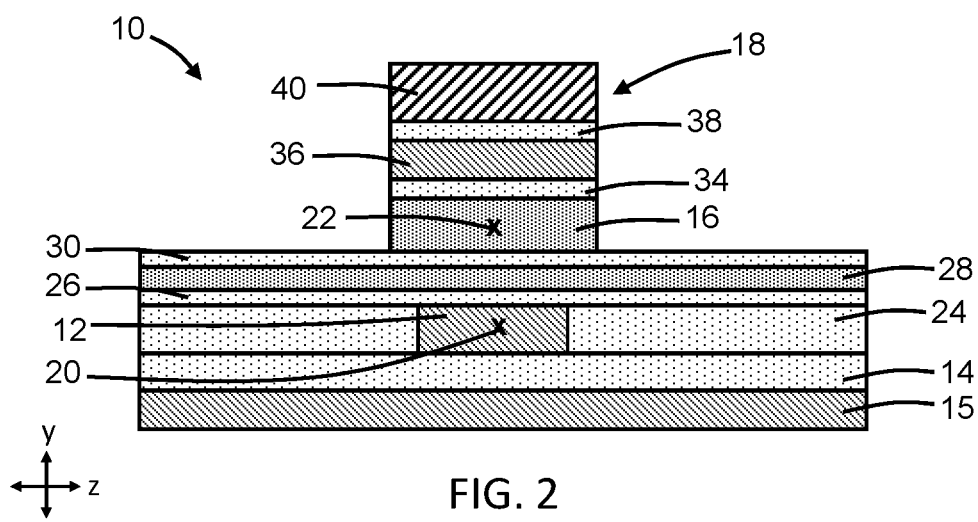
FIG. 2 is a cross-sectional view of the structure taken generally along line 2-2 in FIG. 1.
Figure 2A:
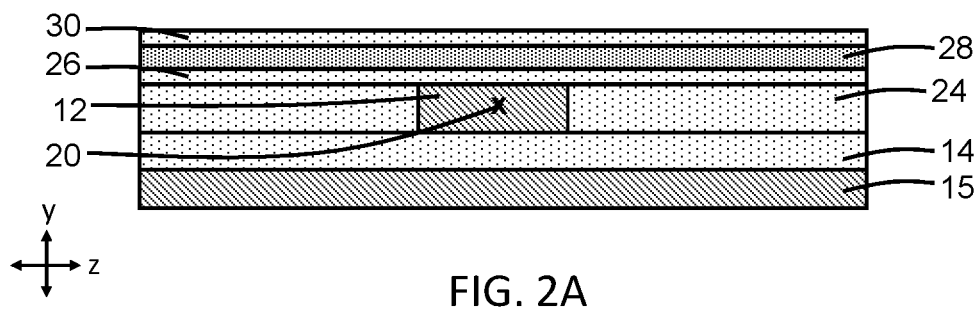
FIG. 2A is a cross-sectional view of the structure taken generally along line 2A-2A in FIG. 1.

With reference to FIGS. 1, 2, 2A and in accordance with embodiments of the invention, a structure 10 includes a waveguide core 12 arranged over a dielectric layer 14, and an electro-optic modulator 18 that includes a waveguide core 16 arranged over the waveguide core 12. The waveguide core 12 extends symmetrically along a longitudinal axis 20 and is arranged in a vertical direction beneath the waveguide core 16, and the waveguide core 16 extends symmetrically along a longitudinal axis 22 and is arranged in a vertical direction beneath the electro-optic modulator 18.

The waveguide core 12 may be composed of a single-crystal semiconductor material, such as single-crystal silicon from a device layer of a silicon-on-insulator (SOI) wafer. The silicon-on-insulator wafer further includes a buried insulator layer composed of a dielectric material, such as silicon dioxide, that provides the dielectric layer 14 and a substrate 15 composed of a single-crystal semiconductor material, such as single-crystal silicon, under the buried insulator layer. The waveguide core 12 may be patterned from the device layer of the silicon-on-insulator wafer by lithography and etching processes during front-end-of-line processing, and the device layer may be fully etched to define a rib waveguide as shown or, alternatively, only partially etched to define a ridge waveguide. The waveguide core 12 may have a constant width over the portion of its length associated with the structure 10.

Dielectric layers 24, 26, 28, 30 composed of respective dielectric materials are sequentially formed over the waveguide core 12. The waveguide core 12 is embedded or buried in the dielectric material of the dielectric layer 24. The dielectric layer 26 is arranged over the dielectric layer 24, the dielectric layer 28 is arranged over the dielectric layer 26, and the dielectric layer 30 is arranged over the dielectric layer 26. The dielectric layer 24 may be composed of a dielectric material, such as silicon dioxide, deposited by chemical vapor deposition and planarized with, for example, chemical mechanical polishing (CMP) to remove topography. The dielectric layer 26 may be composed of dielectric material, such as silicon dioxide, deposited by chemical vapor deposition or atomic layer deposition over the dielectric layer 24. The dielectric layer 28 may be composed of dielectric material, such as silicon nitride, deposited by chemical vapor deposition or atomic layer deposition over the dielectric layer 26. The dielectric layer 30 may be composed of dielectric material, such as silicon dioxide, deposited by chemical vapor deposition or atomic layer deposition over the dielectric layer 28. The dielectric layers 24, 26, 28, 30 are arranged in the vertical direction (i.e., the y-direction) between the waveguide core 12 and the electro-optic modulator 18 such that the waveguide core 12 and the electro-optic modulator 18 are separated and have a non-contacting relationship.

The waveguide core 16 of the electro-optic modulator 18 is arranged over the dielectric layer 30. The waveguide core 16 may be formed from a layer composed of a dielectric material, such as silicon nitride, that is deposited and patterned with lithography and etching processes. The deposited dielectric layer may be fully etched to form the waveguide core 16 as a rib waveguide as shown or, alternatively, the deposited dielectric layer may be partially etched to define a ridge waveguide.

The waveguide core 16 laterally overlaps in the x-direction and in the z-direction with a section of the waveguide core 12. The waveguide core 16 and the overlapped section of the waveguide core 12 may each be shaped as straight waveguide portions. The waveguide core 16, which is truncated, may have a length, L, in a direction along its longitudinal axis 22 (i.e., in the z-direction) that is shorter than the waveguide core 12. The waveguide core 16 and the waveguide core 12 may have equal widths in a direction transverse to the longitudinal axis 22 (i.e., in the x-direction). The waveguide core 16 may be arranged directly over a section of the waveguide core 12 such that the longitudinal axes 20, 22 are displaced vertically and extend parallel or substantially parallel to each other. In an alternative embodiment, the waveguide core 16 may include a taper at each end that functions to reduce the insertion loss.

The electro-optic modulator 18 further includes a dielectric layer 34, an active layer 36, a dielectric layer 38, and an electrode 40 that are arranged over the waveguide core 16 in a multi-layer stack. The dielectric layer 34, active layer 36, dielectric layer 38, and electrode 40 may have be shorter than the waveguide core 16 along the longitudinal axis 22 of the waveguide core 16 (i.e., in the z-direction) and may have a width that is equal to the width of the waveguide core 16 in a direction transverse to the longitudinal axis 22 (i.e., in the x-direction). The active layer 36 is arranged in the vertical direction between the dielectric layer 34 and the dielectric layer 38. The dielectric layer 34 is arranged in the vertical direction between the active layer 36 and the waveguide core 16. In an embodiment, the active layer 36 may be in direct contact with the dielectric layer 34. The dielectric layer 38 is arranged in the vertical direction between the active layer 36 and the electrode 40. In an embodiment, the active layer 36 may be in direct contact with the dielectric layer 38.

In an alternative embodiment, the waveguide core 16, dielectric layer 34, active layer 36, dielectric layer 38, and electrode 40 may have widths and lengths that are equal or substantially equal. In an alternative embodiment, the electro-optic modulator 18 may have a non-rectangular shape.

The dielectric layer 34, active layer 36, dielectric layer 38, and electrode 40 may be formed by serially depositing layers of their respective materials to form the multi-layer stack and then patterning the deposited layers with lithography and etching processes to define a footprint or shape (e.g., a length and a width) for the electro-optic modulator 18. The dielectric layer 34 and the dielectric layer 38 may be composed of a dielectric material, such as silicon dioxide, deposited by atomic layer deposition. The electrode 40 may be composed of a metal, such as copper or cobalt, deposited by atomic layer deposition or chemical vapor deposition.

The active layer 36 may be composed of a material that is electro-optically active and may be deposited by atomic layer deposition or chemical vapor deposition. The tunable material in the active layer 36 may be composed of a material having a permittivity (i.e., dielectric constant) that may be changed based on a change in a bias voltage and associated electric field applied to the active layer 36. The refractive index of the material contained in the active layer 36 is related to the permittivity and, for that reason, the refractive index of the conductor contained in active layer 36 can also be changed based on a change in the applied bias voltage. The refractive index of the conductor contained in the active layer 36 can be varied through the application of the bias voltage to effectively switch the electro-optic modulator 18 between different states for selectively transmitting propagating optical signals of a given wavelength through the structure 10. In an embodiment, the active layer 36 may be composed of a material that is a conductor. In an embodiment, the active layer 36 may be composed of indium-tin oxide (ITO). In an embodiment, the active layer 36 may be composed of another type of inorganic material, such as vanadium oxide or germanium-antimony telluride, or a combination of one or both of these materials with indium-tin oxide. In an embodiment, the active layer 36 may be composed of an electro-optic polymer or a liquid crystal.

Figure 3:
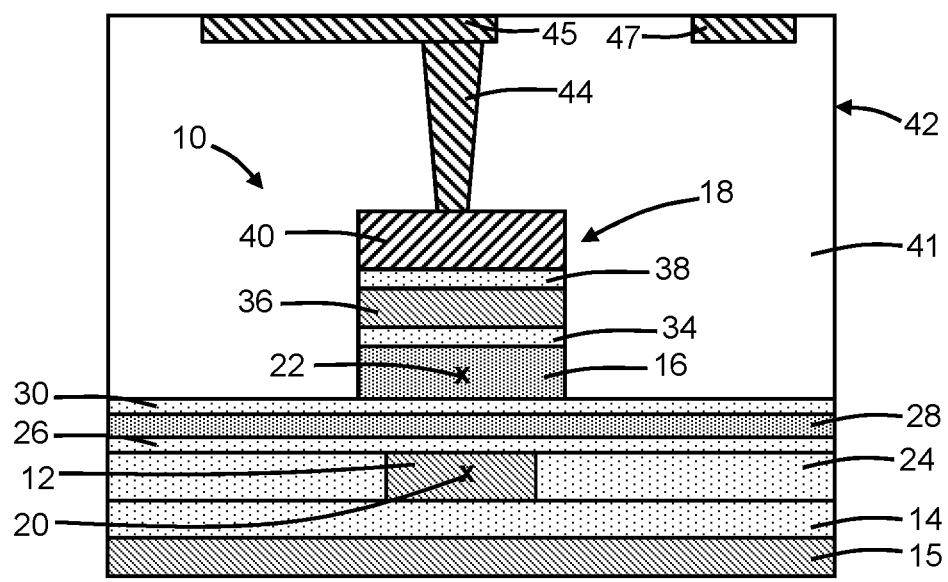
FIG. 3 is a cross-sectional view of the structure at a fabrication stage subsequent to FIG. 2.

With reference to FIG. 3 in which like reference numerals refer to like features in FIG. 2 and at a subsequent fabrication stage, a back-end-of-line stack, generally indicated by reference numeral 42, is formed by back-end-of-line (BEOL) processing over the electro-optic modulator 18. The back-end-of-line stack 42 may include one or more interlayer dielectric layers 41 composed of one or more dielectric materials, such as a carbon-doped silicon oxide, and metallization composed of, for example, copper, tungsten, and/or cobalt that is arranged in the one or more interlayer dielectric layers 41. In an embodiment, the electro-optic modulator 18 may be considered to be part of the back-end-of-line stack 42.

The metallization of the back-end-of-line stack 42 may include a wire 45 and a via 44 that connects the electrode 40 with the wire 45, and a wire 47 and a via 46 (FIG. 1) that connects the waveguide core 12 with the wire 47. The via 46 may connect with the wire 47 at a location removed from the waveguide core 12 and, to that end, may be coupled by a strip 49 of single-crystal semiconductor material with the waveguide core 12. The vias 44, 46 may be located in respective etched contact openings in the one or more interlayer dielectric layers 41. Through these connections, a switchable bias voltage may be applied from the wires 45, 47 in the back-end-of-line stack 42 to generate the electric field that can produce the change in the refractive index of the material contained in the active layer 36.

The structure 10, in any of its embodiments described herein, may be integrated into a photonics chip 50 (FIG. 1) that includes electronic components 52 and additional optical components 54. For example, the electronic components 52 may include field-effect transistors that are fabricated by CMOS front-end-of-line (FEOL) processing.

In use, phase matching between the waveguide core 12 and the electro-optic modulator 18 is leveraged to modulate the optical signal that is subsequently provided from the waveguide core 12 to the electro-optic modulator 18 and, after modulation, from the electro- optic modulator 18 back to the waveguide core 12. An optical signal propagating in a given direction (i.e., the z-direction) in the waveguide core 12 may enter the structure 10 at one end and may be shifted upwardly by the phase-matching between the waveguide core 12 and the electro-optic modulator 18. The electro-optic modulator 18 may be switched between 'ON' and 'OFF' conditions or states by selectively applying one or more bias voltages to the active layer 36 and electrode 40. In one state, the propagating optical signal is directed out of the plane of the electro-optic modulator 18 with a high coupling efficiency. For example, when a bias voltage is not applied (e.g., a bias voltage of 0 volts), the active layer 36 may have a high refractive index providing low absorption and the electro-optic modulator 18 is placed in an 'ON' state characterized by a high coupling efficiency. In another state, the propagating optical signal remains confined within the plane of the electro-optic modulator 18 with a low coupling efficiency. For example, when a bias voltage (e.g., a negative bias voltage) is applied, the active layer 36 may have a low refractive index providing high absorption and the electro-optic modulator 18 is placed in an 'OFF' state characterized by a low coupling efficiency. The electro-optic modulator 18 may function as a plasmonic electro-optic modulator in which the optical signal interacts with electrons in the active layer 36 and electrode 40. The modulated optical signal in the electro-optic modulator 18, when in its 'OFF' state, is shifted downwardly by the phase-matching between the electro-optic modulator 18 and the waveguide core 12, and the modulated optical signal may exit the structure 10 for further propagation through the waveguide core 12 to a destination on the photonics chip 50. Through the selective application of the bias voltage, a propagating optical signal received at the entrance to the structure 10 can be modulated for output at the exit from the structure 10.

The electro-optic modulator 18 may be useful for modulating an optical signal propagating with a given mode and, in particular, TM mode. The modulation provided by the electro-optic modulator 18 is based on a hybrid metal-dielectric stack configuration that may reduce its dimensions in comparison with, for example, MZI modulators.

Figure 4:
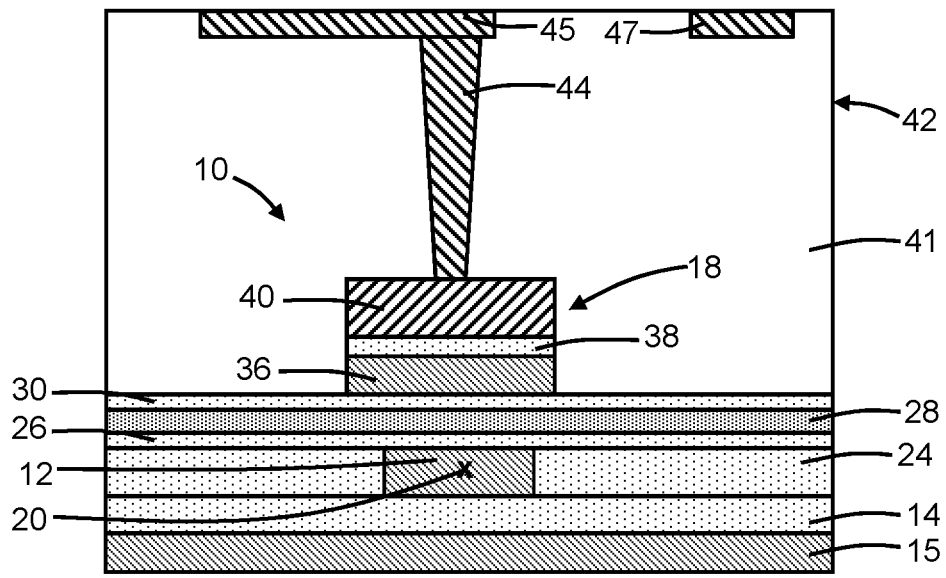
FIGS. 4 and 5 are cross-sectional views of structures in accordance with alternative embodiments of the invention.

With reference to FIG. 4 in which like reference numerals refer to like features in FIG. 3 and in accordance with alternative embodiments of the invention, the waveguide core 16 may be omitted from the construction of the electro-optic modulator 18. With the waveguide core 16 absent, the lowermost dielectric layer 34 of the electro-optic modulator 18 may also be omitted, and the active layer 36 may be in direct contact with the dielectric layer 30.

Figure 5:
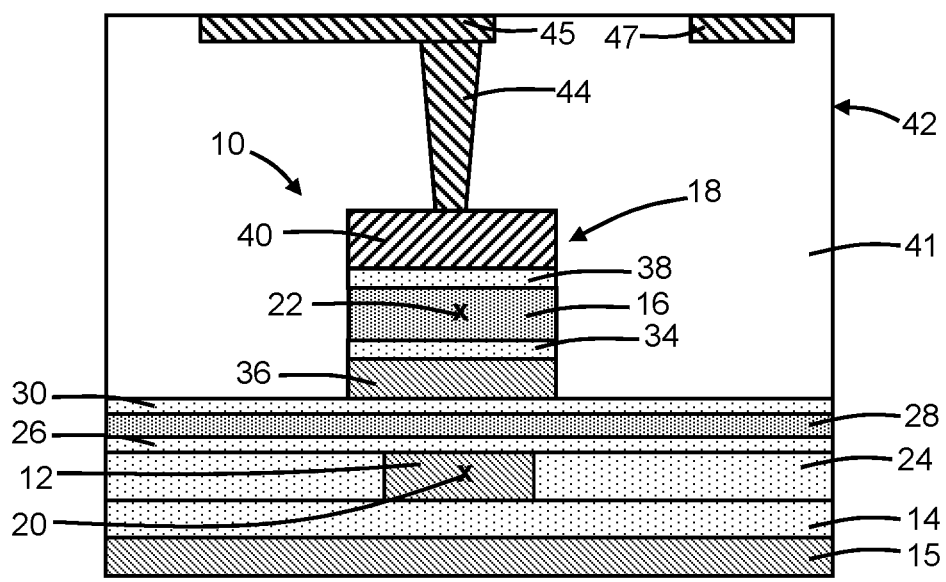

With reference to FIG. 5 in which like reference numerals refer to like features in FIG. 3 and in accordance with alternative embodiments of the invention, the waveguide core 16 and the active layer 36 may be rearranged in the multiple-layer stack of the electro-optic modulator 18 such that the waveguide core 16 is arranged over the active layer 36, instead of under the active layer 36. The dielectric layer 34 may be arranged in the vertical direction between the waveguide core 16 and active layer 36, and the active layer 36 may be in direct contact with the dielectric layer 30. The waveguide core 16 may be formed by the same lithography and etching processes as the dielectric layer 34, active layer 36, dielectric layer 38, and electrode 40, and may have dimensions substantially equal to the dimensions of the dielectric layer 34, active layer 36, dielectric layer 38, and electrode 40.

Figure 6:
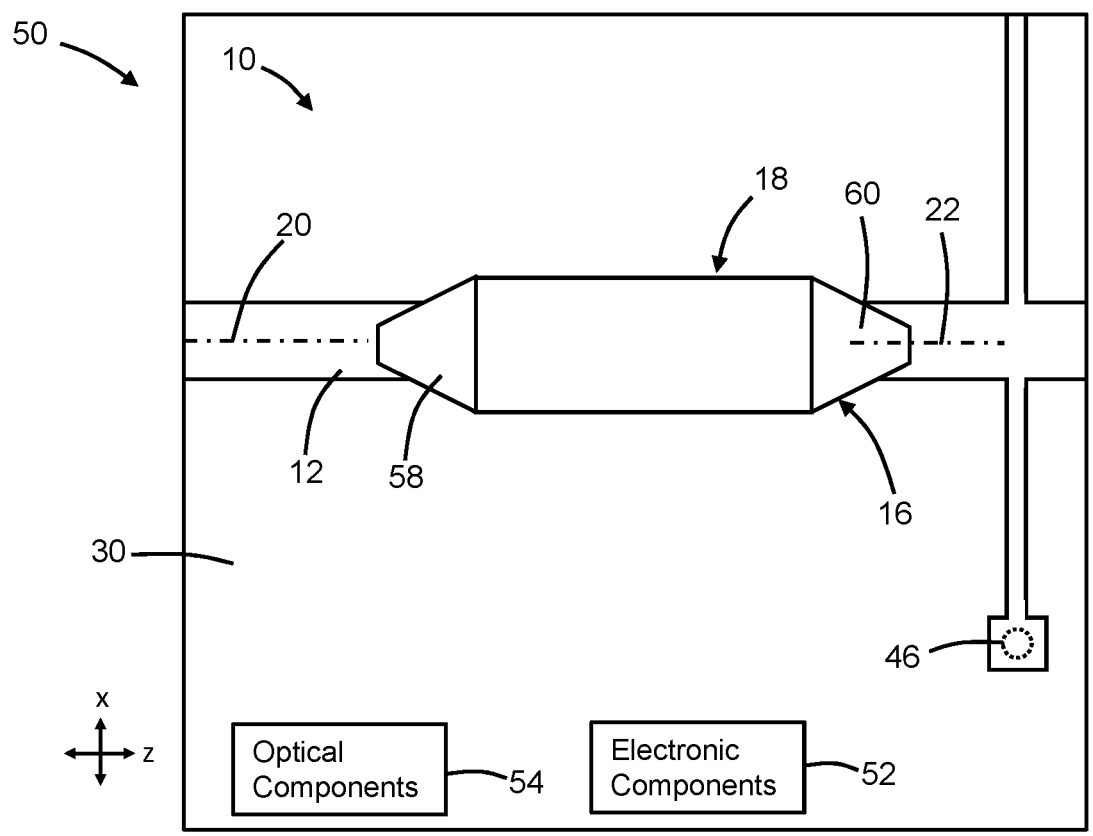
FIG. 6 is a top view of a structure in accordance with alternative embodiments of the invention.

With reference to FIG. 6 in which like reference numerals refer to like features in FIG. 1 and in accordance with alternative embodiments of the invention, the waveguide core 16 may include a taper 58 at an inlet or entrance to the electro-optic modulator 18 and another taper 60 at an outlet or exit from the structure 10. The waveguide core 16 includes a straight section arranged between the tapers 58, 60 along the longitudinal axis 22 of the waveguide core 16. The tapers 58, 60 may be added in order to, for example, reduce the insertion loss of the structure 10.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or "in direct contact with" another feature if intervening features are absent. A feature may be "indirectly on" or "in indirect contact with" another feature if at least one intervening feature is present.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a first waveguide core; and
an electro-optic modulator arranged over a portion of the first waveguide core, the electro-optic modulator including an electrode, an active layer, a second waveguide core, and a first dielectric layer arranged between the active layer and the second waveguide core,
wherein the active layer is comprised of a material having a refractive index that is a function of a bias voltage applied between the electrode and the first waveguide core.

2. The structure of claim 1 wherein the active layer is arranged in a vertical direction between the second waveguide core and the electrode.

3. The structure of claim 1 wherein the second waveguide core is arranged in a vertical direction between the active layer and the electrode.

4. The structure of claim 1 wherein the material of the active layer is indium-tin oxide, the first waveguide core is comprised of single-crystal silicon, the second waveguide core is comprised of silicon nitride, and the dielectric layer is comprised of silicon dioxide.

5. The structure of claim 1 wherein the electrode, the active layer, the second waveguide core, and the first dielectric layer are stacked in a vertical direction.

6. The structure of claim 1 wherein the portion of the first waveguide core is arranged along a first longitudinal axis, and the electro-optic modulator is fully arranged along the first longitudinal axis over the first waveguide core.

7. The structure of claim 6 wherein the second waveguide core is arranged along a second longitudinal axis, the second longitudinal axis is substantially parallel to the first longitudinal axis, and the second waveguide core is arranged in a vertical direction between the active layer and the electrode.

8. The structure of claim 7 further comprising:
one or more second dielectric layers arranged between the first waveguide core and the second waveguide core.

9. The structure of claim 6 wherein the second waveguide core is arranged along a second longitudinal axis, the second waveguide core includes a first taper, a second taper, and a straight section that is arranged along the second longitudinal axis between the first taper and the second taper.

10. The structure of claim 1 further comprising:
a back-end-of-line stack arranged over the electro-optic modulator, the back-end-of-line stack including a first via connected with the electrode and a second via connected with the first waveguide core.

11. The structure of claim 1 further comprising:
one or more second dielectric layers arranged between the electro-optic modulator and the first waveguide core, and the second waveguide core or the active layer is in direct contact with the one or more second dielectric layers.

12. A structure comprising:
a waveguide core;
an electro-optic modulator arranged over a portion of the waveguide core, the electro-optic modulator including an electrode, an active layer, and a first dielectric layer arranged between the active layer and the waveguide core, and the active layer comprised of a material having a refractive index that is a function of a bias voltage applied between the electrode and the waveguide core; and
one or more second dielectric layers arranged between the active layer and the waveguide core.

13. The structure of claim 12 wherein the electrode is comprised of copper.

14. A method comprising:
patterning a single-crystal semiconductor layer to form a first waveguide core; and
forming an electro-optic modulator including an electrode, a second waveguide core, a first dielectric layer, and an active layer that have a stacked arrangement over a portion of the first waveguide core,
wherein the first dielectric layer is positioned in the stacked arrangement between the active layer and the second waveguide core, and the active layer is comprised of a material having a refractive index that is a function of a bias voltage applied to the electrode and the first waveguide core.

15. The method of claim 14 wherein the active layer is positioned in the stacked arrangement in a vertical direction between the second waveguide core and the electrode.

16. The method of claim 14 wherein the second waveguide core is positioned in the stacked arrangement in a vertical direction between the active layer and the electrode.

17. The method of claim 14 wherein the electrode, the active layer, the second waveguide core, and the first dielectric layer are stacked in a vertical direction within the stacked arrangement.

18. The method of claim 14 further comprising:
forming one or more second dielectric layers arranged between the electro-optic modulator and the first waveguide core.

19. The structure of claim 7 wherein the second waveguide core has a length, and the first dielectric layer, the active layer, and the electrode are shorter than the length of the second waveguide core in a first direction along the second longitudinal axis.

20. The structure of claim 19 wherein the second waveguide core, the first dielectric layer, the active layer, and the electrode have equal widths in a second direction transverse to the second longitudinal axis.

* * * * *